United States Patent
Snow et al.

(10) Patent No.: US 10,337,374 B2
(45) Date of Patent: Jul. 2, 2019

(54) METHODS AND SYSTEMS FOR AN AFTERTREATMENT CATALYST

(71) Applicant: Ford Global Technologies, LLC, Dearborn, MI (US)

(72) Inventors: Rachel Alison Snow, Canton, MI (US); Eva Thanasiu, Trenton, MI (US); Paul M. Laing, Plymouth, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 15/460,051

(22) Filed: Mar. 15, 2017

(65) Prior Publication Data

US 2018/0266292 A1 Sep. 20, 2018

(51) Int. Cl.
| | | |
|---|---|---|
| *F01N 3/20* | (2006.01) | |
| *F01N 3/10* | (2006.01) | |
| *F01N 3/28* | (2006.01) | |
| *F01N 9/00* | (2006.01) | |
| *F01N 13/10* | (2010.01) | |
| *F01N 3/021* | (2006.01) | |

(52) U.S. Cl.
CPC ............ *F01N 3/206* (2013.01); *F01N 3/021* (2013.01); *F01N 3/101* (2013.01); *F01N 3/106* (2013.01); *F01N 3/108* (2013.01); *F01N 3/2066* (2013.01); *F01N 3/2842* (2013.01); *F01N 9/00* (2013.01); *F01N 13/107* (2013.01); *F01N 2340/06* (2013.01); *F01N 2410/06* (2013.01); *F01N 2430/02* (2013.01); *F01N 2430/06* (2013.01); *F01N 2560/05* (2013.01); *F01N 2560/06* (2013.01); *F01N 2560/07* (2013.01); *F01N 2610/02* (2013.01); *F01N 2610/03* (2013.01); *F01N 2900/1626* (2013.01); *Y02T 10/22* (2013.01); *Y02T 10/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,184,462 A | * | 2/1993 | Schatz | B01D 53/9481 60/274 |
| 5,388,405 A | * | 2/1995 | Fujishita | F01N 3/0814 60/297 |
| 5,647,203 A | * | 7/1997 | Abe | B01D 53/9481 60/274 |
| 5,655,362 A | * | 8/1997 | Kawajiri | F01N 3/0835 60/276 |

(Continued)

OTHER PUBLICATIONS

Li, Yue, et al., "Low-Temperature Water-Gas Shift Reactioni over Cu- and Ni-loaded Cerium Oxide Catalysts," Applied catalysis B: Environmental, 2000, vol. 27, pp. 179-191, 14 pages.

(Continued)

*Primary Examiner* — Kaity V Chandler
(74) *Attorney, Agent, or Firm* — Julia Voutyras; McCoy Russell LLP

(57) ABSTRACT

Methods and systems are provided for a steam reforming catalyst. In one example, a method may include flowing exhaust gas from a first cylinder bank directly to a three-way catalyst, flowing exhaust gas from a second cylinder bank directly to a steam reforming catalyst, and flowing exhaust gas from the steam reforming catalyst to the three-way catalyst.

19 Claims, 6 Drawing Sheets

(56) References Cited

U.S. PATENT DOCUMENTS

| | | | | |
|---|---|---|---|---|
| 6,122,910 | A * | 9/2000 | Hoshi | F01N 3/0835 60/285 |
| 6,151,890 | A * | 11/2000 | Hoshi | F01N 3/0807 60/285 |
| 6,244,044 | B1 * | 6/2001 | Bartley | B01D 53/944 60/274 |
| 6,334,306 | B1 * | 1/2002 | Mori | B01D 53/9454 60/297 |
| 7,107,761 | B2 * | 9/2006 | Fukuma | F01N 3/0842 123/568.11 |
| 7,168,239 | B2 * | 1/2007 | Ingram | F01N 3/2006 60/274 |
| 7,552,583 | B2 * | 6/2009 | Robel | F01N 3/2073 60/286 |
| 7,788,923 | B2 * | 9/2010 | Rowells | F02B 29/0418 123/562 |
| 8,087,232 | B2 * | 1/2012 | Miyashita | F01N 3/0814 60/280 |
| 8,209,970 | B2 * | 7/2012 | Gonze | B60K 6/445 60/303 |
| 8,443,587 | B2 | 5/2013 | Narayanaswamy et al. | |
| 8,506,912 | B1 | 8/2013 | Hepburn et al. | |
| 2006/0254140 | A1 | 11/2006 | Finkbeiner et al. | |
| 2007/0006573 | A1 * | 1/2007 | Hu | B01D 53/9477 60/285 |
| 2008/0168763 | A1 * | 7/2008 | Ginter | B01D 53/9418 60/286 |
| 2008/0184701 | A1 * | 8/2008 | Katoh | F01N 3/0814 60/299 |
| 2009/0084092 | A1 | 4/2009 | Miyoshi et al. | |
| 2010/0037597 | A1 * | 2/2010 | Eckhoff | F01N 3/0814 60/286 |
| 2010/0251700 | A1 * | 10/2010 | Wan | F01N 3/0231 60/287 |
| 2010/0287917 | A1 * | 11/2010 | Wada | B01D 53/9409 60/299 |
| 2011/0131952 | A1 * | 6/2011 | Onodera | B01D 53/9445 60/274 |
| 2012/0017572 | A1 * | 1/2012 | Tsujimoto | F01N 3/2033 60/286 |
| 2013/0125542 | A1 * | 5/2013 | Hayakawa | F01N 3/103 60/602 |
| 2013/0202508 | A1 | 8/2013 | Hepburn et al. | |
| 2013/0263579 | A1 * | 10/2013 | Takeuchi | F01N 3/2053 60/274 |
| 2014/0034002 | A1 * | 2/2014 | Bromberg | F02M 25/00 123/1 A |
| 2015/0052890 | A1 * | 2/2015 | Shinoda | F02D 41/025 60/603 |
| 2015/0107229 | A1 * | 4/2015 | Fuchsbauer | F02D 41/0082 60/274 |
| 2016/0032869 | A1 * | 2/2016 | Boyer | F02M 26/04 123/568.11 |
| 2016/0076419 | A1 * | 3/2016 | Roy | F01N 3/2889 60/274 |
| 2016/0131056 | A1 * | 5/2016 | Henry | F02D 41/0082 60/274 |
| 2016/0258373 | A1 * | 9/2016 | Tanaka | F01N 3/0814 |
| 2017/0260916 | A1 * | 9/2017 | Kraemer | F02M 35/10065 |
| 2017/0363025 | A1 * | 12/2017 | Yoshinaga | F02D 41/0002 |
| 2018/0073444 | A1 * | 3/2018 | Zhang | F02D 11/105 |
| 2018/0135481 | A1 * | 5/2018 | Phillips | F01N 3/101 |

OTHER PUBLICATIONS

Cai, Xing, et al., "Mechanism Study of Reaction between CO and NiO(001) Surface During Chemical Looping Combustion: Role of Oxygen," Chemical Engineering Journal, 2014, vol. 244, pp. 464-472, 10 pages.

Boisen, A., et al., "Support Effects and Catalytic Trends for Water Gas Shift Activity of Transition Metals," Journal of Molecular Catalysis A: Chemical, 2010, vol. 315, pp. 163-170, 8 pages.

Wheeler, C., et al., "The Water-Gas-Shift Reaction at Short Contact Times," Journal of Catalysis, 2004, vol. 223, pp. 191-199, 9 pages.

* cited by examiner

METHODS AND SYSTEMS FOR AN AFTERTREATMENT CATALYST

FIELD

The present description relates generally to methods and systems for a steam reforming catalyst.

BACKGROUND/SUMMARY

Engine cold start emissions may contribute to a large portion of a total vehicle emissions. During some engine cold starts, an engine control strategy may include initiating cold start emissions reduction (CSER), wherein an engine calibration is altered such that a beginning of the cold start includes producing additional heat energy for a catalyst. This may include increased fuel injection volume and delayed spark timings to increase exhaust gas temperatures.

However, CSER calibrations are inherently inefficient due to heat loss to one or more of a turbocharger and an exhaust system upstream of the catalyst. Furthermore, increased fuel injection volumes increase particulate emissions relative to each injection. CSER may be desired outside of a beginning of a cold start to maintain a catalyst temperature. This results in increased particulate emissions that may necessitate inclusion of a particulate filter for meeting emissions standards, thereby increasing vehicle production costs.

Additional aftertreatment deficiencies may appear during electric hybrid applications for vehicles configured with a control strategy for operating in a fully electric mode (e.g., vehicle is propelled by an electric motor and is not propelled by combustion) while the hybrid vehicle's engine is not rotating. Thus, exhaust gas is not produced, resulting in a cooling of the catalyst. In this way, hybrid vehicle applications and propulsion via the electric motor may be limited in light of the cooling of the catalyst. This may decrease fuel economy.

Other attempts to address catalyst temperatures include electrically heating the catalyst via an electric heating element. During the cold start and other engine operating conditions where the catalyst temperature is less than a light-off temperature, the electric heating element may be activated. Similar to the problems described above, doing this may result in decreased fuel economy.

However, the inventors herein have recognized potential issues with such systems. As one example, the electric heating element consumes fuel and/or reduces a battery state of charge (SOC). As such, during hybrid vehicle applications utilizing an electric motor powered by a battery, heating the catalyst via the electric element may hamper an all-electric application of the hybrid vehicle. Additionally, electric heating elements are costly, resulting in increased production costs.

In one example, the issues described above may be addressed by a method comprising flowing lean exhaust gas from a first group of cylinders directly to a three-way catalyst, flowing rich exhaust gas from a second group of cylinders directly to a steam reforming catalyst, and flowing exhaust gas from the steam reforming catalyst to the three-way catalyst. In this way, an exothermic reaction between oxidants and reductants from the two separated exhaust gases may occur adjacent the three-way catalyst, thereby providing additional thermal energy to the three-way catalyst.

As one example, the first cylinder bank is coupled to a first exhaust passage and the second cylinder bank is coupled to a second exhaust passage. The first exhaust passage leads to at least the three-way catalyst, while the second exhaust passage leads to the steam reforming catalyst. In one example, where a three-way catalyst temperature is greater than a threshold temperature, exhaust gas flows directly from the first and second cylinder banks to the three-way catalyst. In other examples, where the three-way catalyst temperature is less than the threshold temperature, exhaust gas continues to flow directly from the first cylinder bank to the three-way catalyst while exhaust gas from the second exhaust bank directly to the steam reforming catalyst before it flows to the three-way catalyst. Additionally, the second cylinder bank may operate rich and the first cylinder bank may operate lean. By doing this, steam reforming reactions and water gas shift reactions may occur at the steam reforming catalyst, producing hydrogen gas ($H_2$). $H_2$ may combine and react with oxidizing species in the lean exhaust gas (e.g., $O_2$, NO) at the three-way catalyst and release thermal energy. This may heat the three-way catalyst more rapidly than only relying on SCER adjustments.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
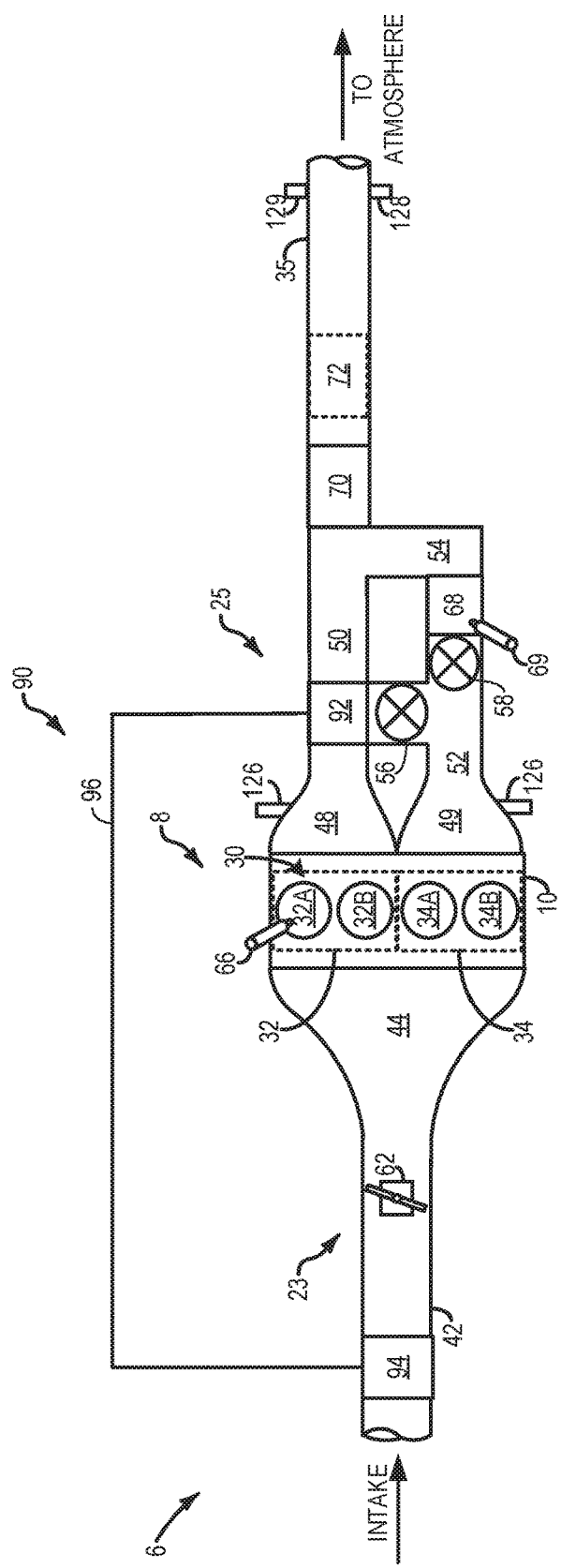
FIG. 1 shows an engine having a plurality of cylinders coupled to an exhaust system having a steam reforming catalyst (SRC).
Figure 1:
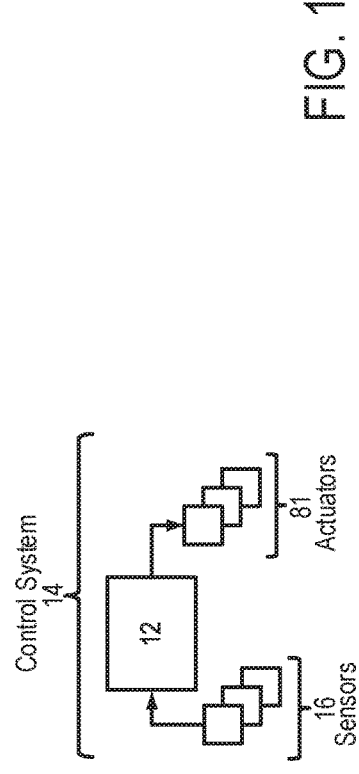
Figure 2A:
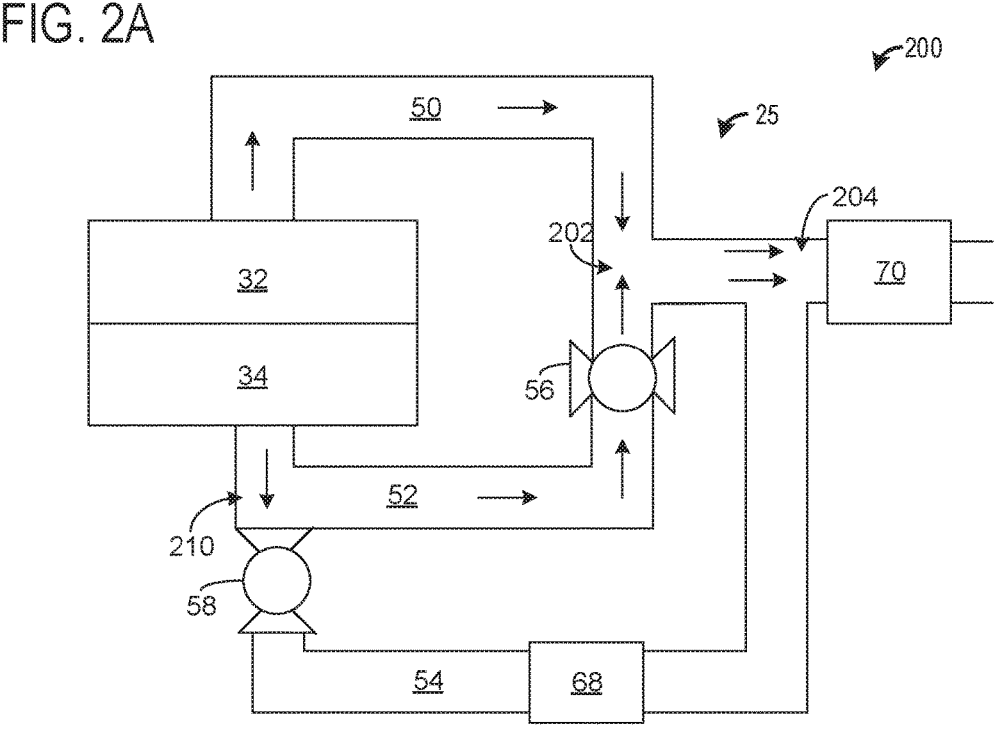
FIGS. 2A and 2B show detailed views of exhaust gas flow from first and second cylinder banks through exhaust passages.
Figure 2B:
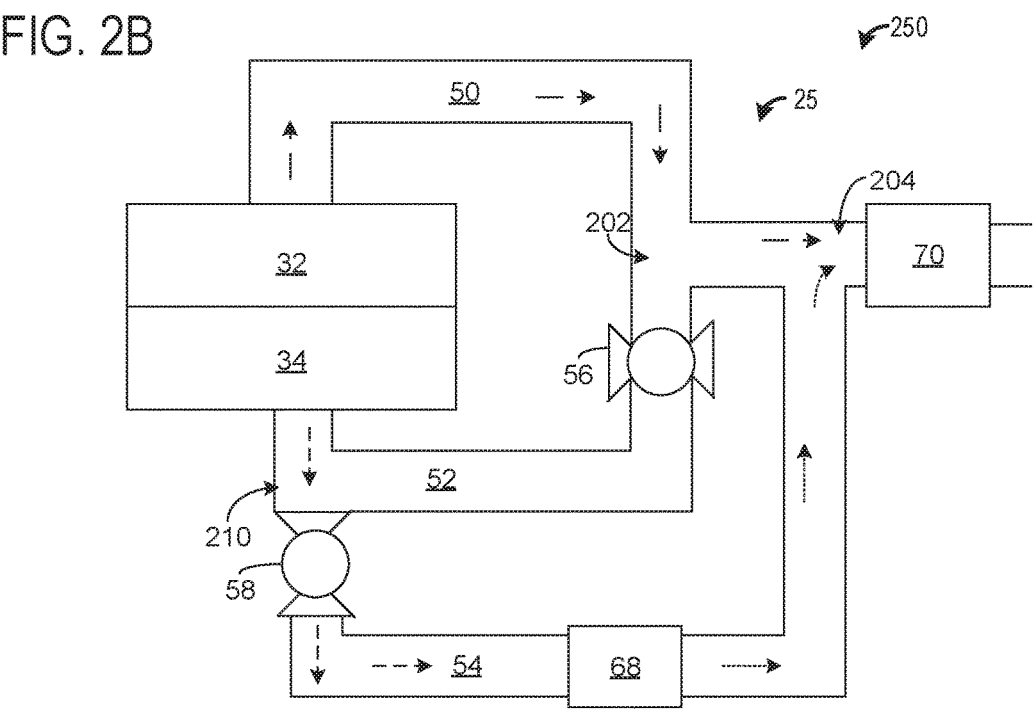
Figure 3:
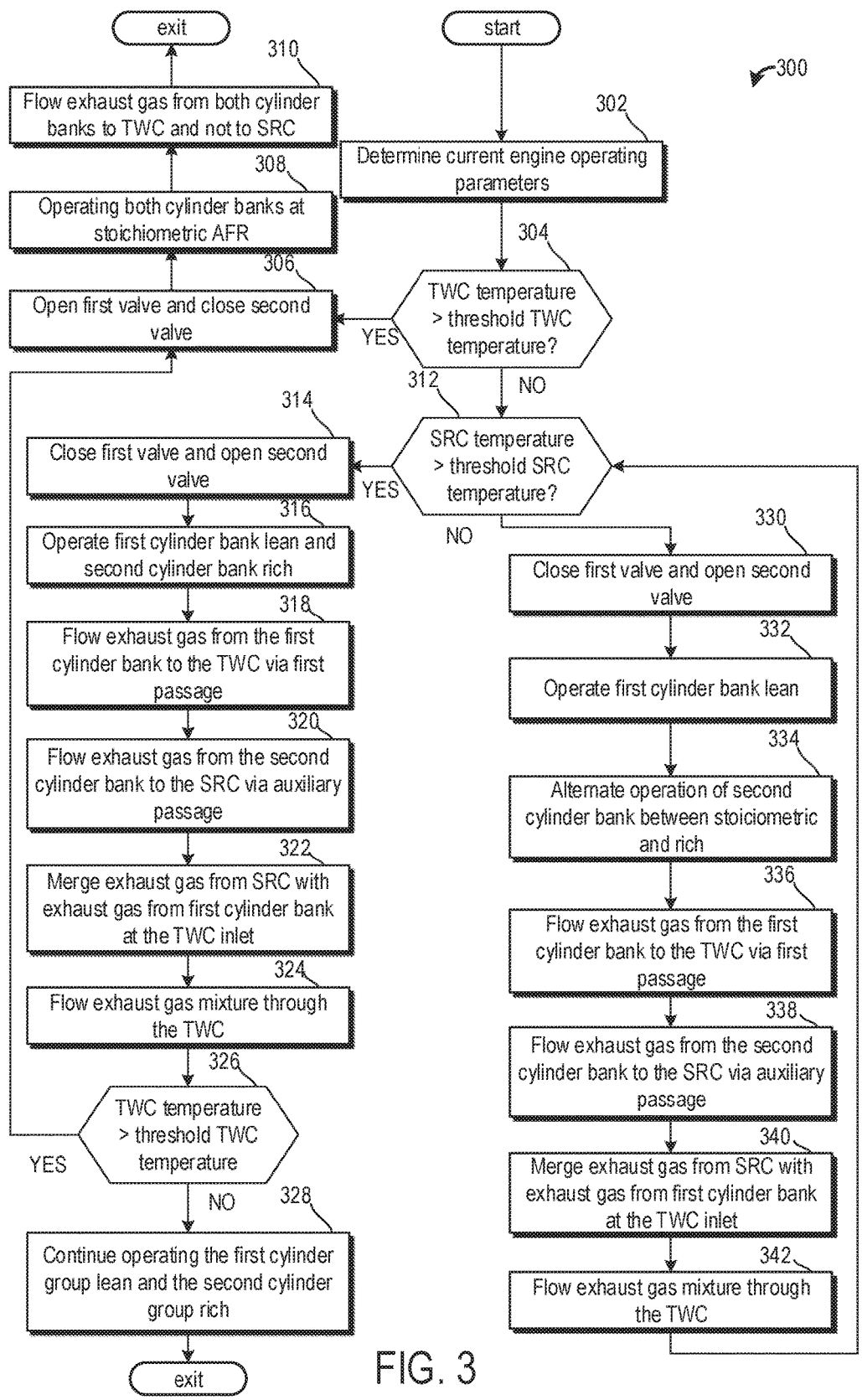
FIG. 3 shows a method for operating first and second cylinder banks and corresponding valves in response to temperatures of the three-way catalyst (TWC) and the SRC.
Figure 5:
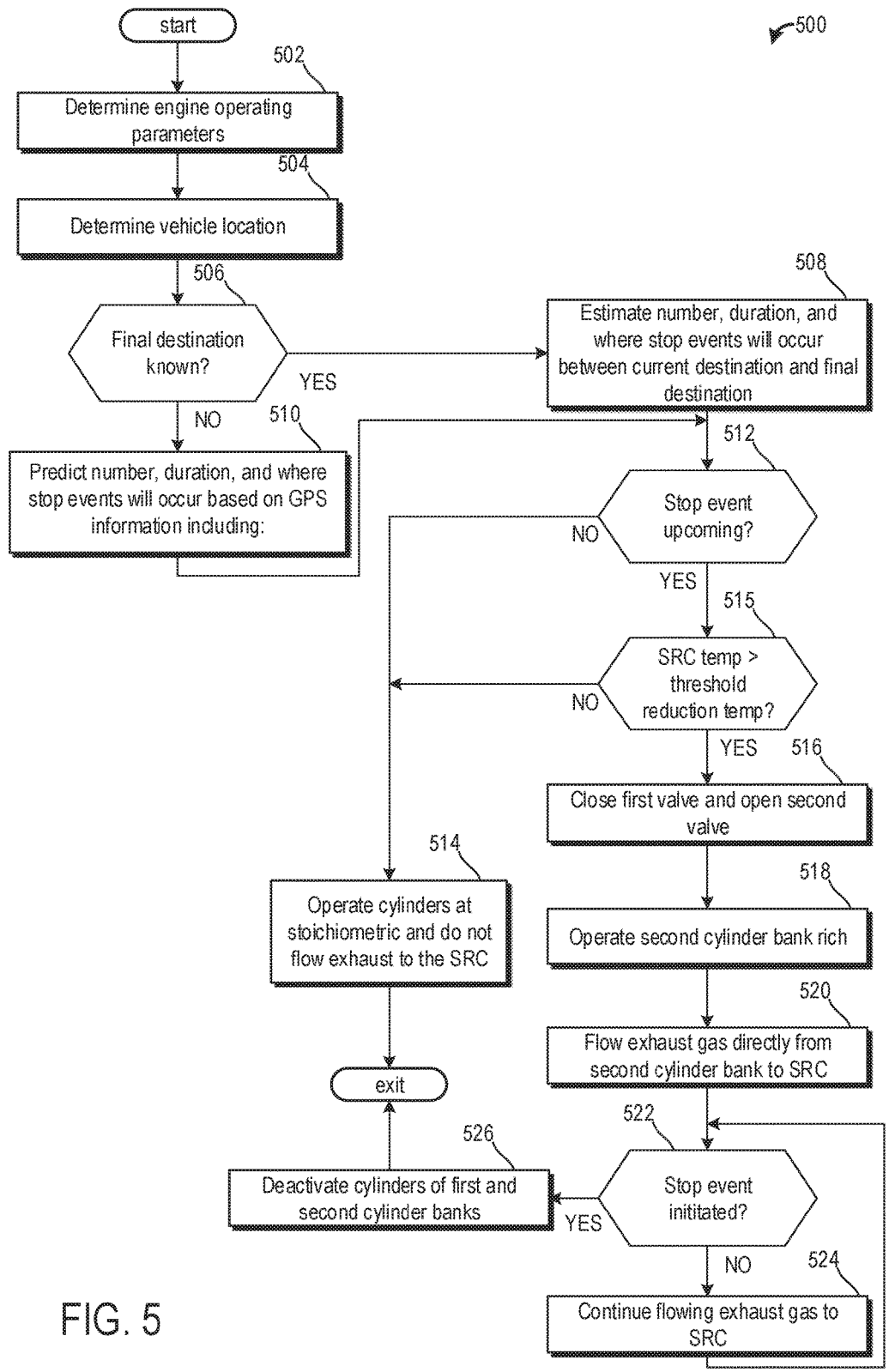
FIG. 5 shows a method for reducing an oxidation state of the SRC.
Figure 6:
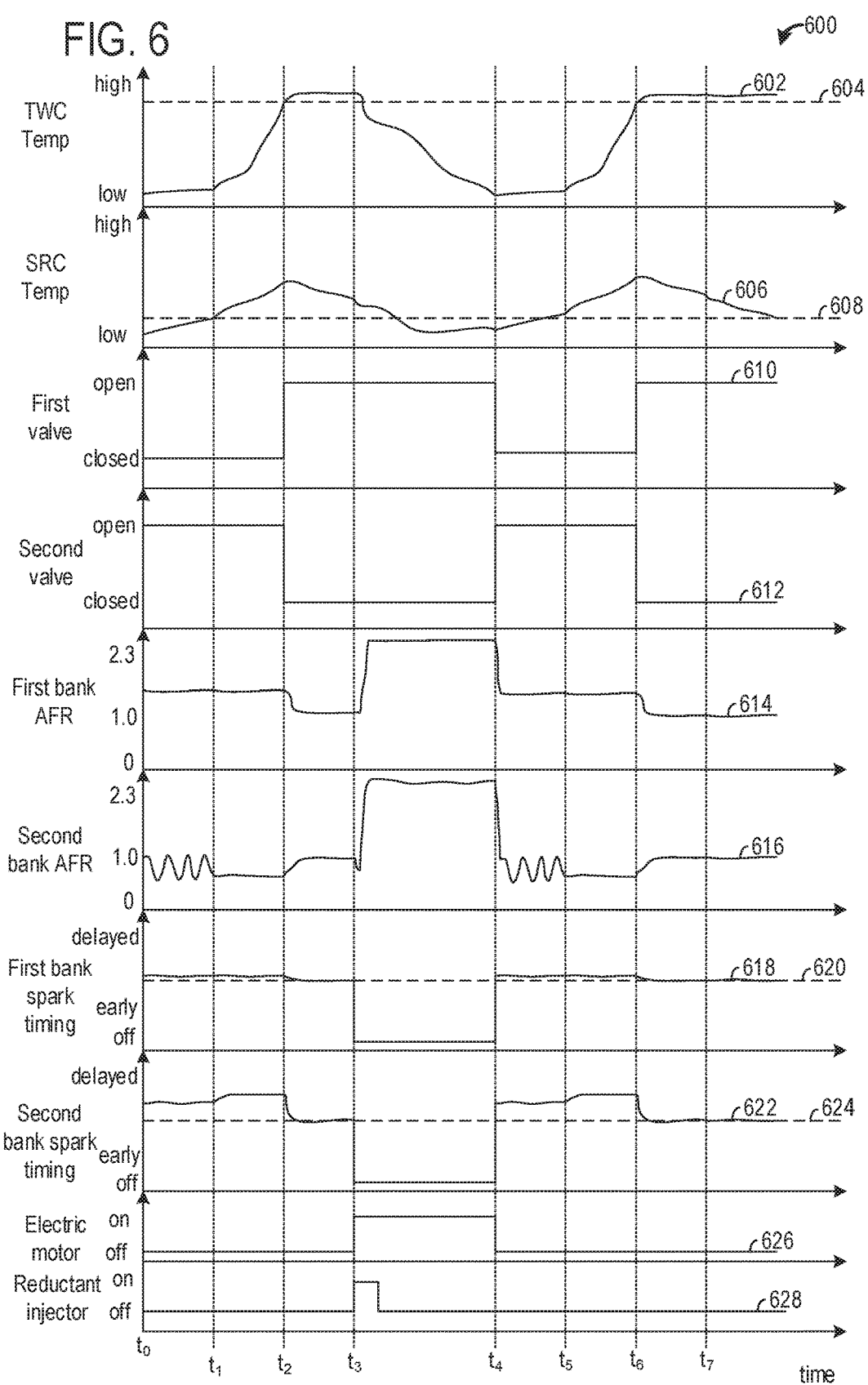
FIG. 6 shows engine operating sequence graphically illustrating one or more engine operating parameters while a vehicle is being driven on a road.

The following description relates to systems and methods for an exhaust gas system comprising a three-way catalyst (TWC) and a steam reforming catalyst (SRC). The TWC and SRC are located in separate exhaust passages, as shown in FIG. 1. Specifically, the engine comprises a first cylinder bank fluidly coupled to a first exhaust passage and a second cylinder bank fluidly coupled to a second exhaust passage. The second exhaust passage bifurcates at a valve, where the valve may direct exhaust gas from the second cylinder bank into either a continuation of the second exhaust passage or an auxiliary passage. The SRC is housed in the auxiliary passage. When the valve is in the closed position, exhaust gas continues to flow through the second exhaust passage, as shown in FIG. 2A. When the valve is in the open position, exhaust gas is directed to flow through the auxiliary passage and through the SRC, as shown in FIG. 2B. A method for operating the valve based on temperatures of one or more of the TWC and the SRC is shown in FIG. 3. The second cylinder bank may be operated rich when the exhaust gas is directed to the SRC. As such, unburned fuel particulates may impinge onto surfaces of the SRC or the auxiliary passage. A method for removing coked fuel particulates is described in FIG. 4. As the SRC reduces oxidants in the rich exhaust gas from the second cylinder bank, the SRC is oxidized to a less desired oxidation state. As such, a method for reducing the SRC is shown in FIG. 5. An operating sequence illustrating the engine of FIG. 1 implementing the method depicted in FIG. 3 is shown in FIG. 6. The operating sequence illustrates a plurality of engine operating parameters adjustments based on one or more changing engine conditions.

FIGS. 1-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes a tailpipe 35 that routes exhaust gas to the atmosphere. Throttle 62 may be located in intake passage 42 downstream of a boosting device, such as a turbocharger 90 and upstream of an after-cooler (not shown). When included, the after-cooler may be configured to reduce the temperature of intake air compressed by the boosting device.

In one example, the turbocharger 90 includes at least a turbine 92 and a compressor 94 located in the engine exhaust 25 and the engine intake 23, respectively. As exhaust gases flow through the turbine 92, a blade rotates, and mechanical energy from the turbine 92 is imparted onto the compressor 94 via a shaft 96. As such, the compressor 94 compresses intake air flowing to the engine 10. The turbocharger 90 is optional and may be omitted in some embodiments. Alternatively, the vehicle system 6 may include a supercharger wherein the compressor 94 is driven solely via an electric motor and the turbine is omitted.

The cylinders 30 are shown in an inline arrangement and separated into two groups and/or banks. Specifically, there are four cylinders 30 separated into a first cylinder bank 32 and a second cylinder bank 34. The first cylinder bank 32 comprises two cylinders, namely cylinders 32A and 32B. Likewise, the second cylinder bank 34 comprises two cylinders, namely cylinders 34A and 34B. The first cylinder bank 32 and the second cylinder bank 34 may be operated differently than one another. Furthermore, individual cylinders within each of the cylinder banks may be operated differently from other cylinders within the same bank. For example, cylinder 32A may be operated differently than cylinder 32B. Operating cylinders differently may include disparate fueling, spark timing, air/fuel ratios, and injection timing.

It will be appreciated that there may be other numbers and configurations of cylinders without departing from the scope of the present disclosure. For example, the engine may be a V-6 engine where cylinder groups are located on opposite sides of the "V", each comprising three cylinders. Additionally or alternatively, first and second cylinder groups may comprise different numbers of cylinders. As an example, for an inline six cylinder engine, the first cylinder group may comprise four cylinder and the second cylinder bank may comprise two cylinders. As an example for a four cylinder engine, the first cylinder group may comprise two cylinders and the second cylinder group may comprise two cylinders different than the cylinders included in the first cylinder group.

Engine exhaust 25 includes a first exhaust manifold 48 fluidly coupled to the first cylinder bank 32. Similarly, the engine exhaust 25 includes a second exhaust manifold 49 fluidly coupled to the second cylinder bank 34. The first exhaust manifold 48 and the second exhaust manifold 49 are fluidly separated. As such, exhaust gas from the first cylinder bank 32 is directed to the first exhaust gas manifold 48 and does not mix with exhaust gas in the second exhaust gas manifold 49. In this way, different compounds in the exhaust gases produced by the first 32 and second 34 cylinder banks do not react in either the first 48 or second 49 exhaust manifolds.

Each of the first 48 and second 49 exhaust manifolds are fluidly coupled to separate exhaust passages. Specifically, the first exhaust manifold 48 is fluidly coupled to a first exhaust passage 50 and the second exhaust manifold 49 is fluidly coupled to a second exhaust passage 52. The turbine 92 and an after-treatment device 70 are housed in the first exhaust passage 48. Herein, the after-treatment device 70 is a three-way catalyst (TWC) 70. However, it will be appreciated that the after-treatment device 70 may not be a TWC in other embodiments. For example, the after-treatment device 70 may be a diesel oxidation catalyst, a selective reduction catalyst, etc. The turbine 92 is upstream of the TWC 70 relative to a direction of exhaust gas flow. The second exhaust passage 49 is fluidly coupled to the turbine 92. As such, exhaust gas from both the first cylinder bank 32 and the second cylinder bank 34 may flow through the turbine 92 before flowing to the TWC 70. In one example, the turbine 92 is a twin scroll turbine with each scroll leading to a different blade of the turbine 92. In some examples, the blades of the turbine 92 are identical in size and therefore provide similar compression ratios. Alternatively, the blades of the turbine 92 may be differently sized, with a smaller blade corresponding to the first exhaust passage 50 and a larger blade corresponding to the second exhaust passage 52. It will be appreciated that the larger blade may correspond to the first exhaust passage 50 and the smaller blade may correspond to the second exhaust passage 52 without departing from the scope of the present disclosure.

The second exhaust passage 52 is also fluidly coupled to an auxiliary passage 54, wherein a steam reforming catalyst (SRC) 68 is located. The SRC 68 is a Ni based catalyst. Specifically, the SRC 68 comprises Ni impregnated directly into a honeycomb substrate. Since a washcoat is not used to coat the Ni onto the substrate, a heat capacity of the SRC 68 is 25 to 50% lower than a heat capacity of the TWC 70. As such, less thermal energy is lost through the SRC 68. In one example, the substrate is comprised of cordierite.

The SRC may comprise 2 to 20 wt. % nickel impregnated onto the substrate. The combination of the Ni-cordierite is configured to perform steam reforming reactions and water-gas shift reactions, as shown by equations 1 and 2, respectively, below.

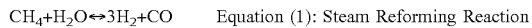

$$CH_4 + H_2O \leftrightarrow 3H_2 + CO \quad \text{Equation (1): Steam Reforming Reaction}$$

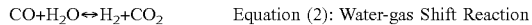

$$CO + H_2O \leftrightarrow H_2 + CO_2 \quad \text{Equation (2): Water-gas Shift Reaction}$$

Equation 1 shows the conversion of water and methane into hydrogen gas and carbon monoxide. Methane is used by way of example and it will be appreciated that other hydrocarbons may be consumed in the steam reforming reaction. For example, if ethane were depicted, then two equivalents of water would be consumed and five equivalents of hydrogen gas and two equivalents of carbon monoxide would form. Equation 2 shows the conversion of carbon monoxide and water into hydrogen gas and carbon dioxide. In this way, the SRC 68 is configured to oxidize hydrocarbons into carbon dioxide while reducing water into hydrogen gas.

In some embodiments, an injector 69 is positioned to inject a reductant into the auxiliary passage 54 upstream of the SRC 68. The reductant may be one or more of a gaseous ammonia, urea, and fuel. As such, the injector 69 is fluidly coupled to a reservoir housing the reductant. As exhaust gas flows through the SRC 68, it may oxidize from Ni to NiO. By reducing the SRC from the NiO to Ni oxidation state, a light-off temperature of the SRC may decrease, thereby converting gases sooner, as shown in equations 1 and 2. This will be described in greater detail below.

The second passage 52 bifurcates adjacent to a first exhaust valve 56 and a second exhaust valve 58. The first exhaust valve 56 adjusts the flow of exhaust gas from the second exhaust passage 52 to the turbine 92. Herein, the first exhaust valve 56 may also be referred to as turbine valve 56. In one example, the first exhaust valve 56 is a binary valve having open and closed positions. When the first exhaust valve 56 is in the open position, exhaust gas from the second passage 52 flows to the turbine 92 and into the first passage 50. When the first exhaust valve 56 is in the closed position, exhaust gas from the second passage 52 cannot flow to the turbine 92.

In one example, the first exhaust valve 56 may be omitted and the second exhaust valve 58 may be a three-way valve. In this way, the three-way valve may be arranged at the bifurcation of the second exhaust passage 52.

The second exhaust valve 58 adjusts the flow of exhaust gas from the second exhaust passage 52 to the SRC 68. Herein, the second exhaust valve 58 may also be referred to as SRC valve 58. In one example, the second exhaust valve 58 is a binary valve having open and closed positions. When the second exhaust valve 58 is in the open position, exhaust gas from the second passage 52 flows to the SRC 68 and into the auxiliary passage 54. When the second exhaust valve 58 is in the closed position, exhaust gas from the second passage 52 cannot flow to the SRC 68 and therefore does not flow into the auxiliary passage 54.

The first exhaust valve 56 and the second exhaust valve 58 are operated dependently of one another. Specifically, when the first exhaust valve 56 is in the open position, the second exhaust valve 58 is moved to the closed position. In this way, exhaust gas flows from the second exhaust passage 52 directly to the turbine 92 without flowing to the SRC 68. Additionally, when the first exhaust valve 56 is moved to the closed position, the second exhaust valve 58 is moved to the open position. By doing this, exhaust gas flows directly from the second exhaust passage 52 directly to the SRC 68 without flowing through the turbine 92. The flow of exhaust gas and actuation of the first exhaust valve 56 and the second exhaust valve 58 are described in greater detail below with respect to FIGS. 2A and 2B.

However, if the TWC has not reached a light-off temperature (e.g, the TWC temperature is less than the threshold TWC temperature), then the first exhaust valve 56 is closed and the second exhaust valve 58 is opened. As such, exhaust gas from the second cylinder bank 34 flows directly to the SRC 68 without flowing to the turbine 92. Specifically, exhaust gas flows from the second cylinder bank, through the second exhaust passage 52, through an open second exhaust valve 58, and to the SRC 68 in the auxiliary passage 54.

Engine exhaust 25 may also include an optional particulate filter (PF) 72, which temporarily filters PMs from entering gases, positioned downstream of TWC 70. In one example, as depicted, PF 72 is a particulate matter retaining system. PF 72 may have a monolith structure made of, for example, cordierite or silicon carbide, with a plurality of channels inside for filtering particulate matter from diesel exhaust gas. Tailpipe exhaust gas that has been filtered of PMs, following passage through PF 72, may be measured in a PM sensor and expelled to the atmosphere via exhaust passage 35.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensors 126 configured to measure a flow rate of exhaust gas into the first 48 and second 49 exhaust gas manifolds, exhaust gas sensor (located in exhaust manifold 48), temperature sensor 128, pressure sensor 129 (located downstream of emission control device 70), turbine valve 56, and SRC valve 58. Other sensors such as additional pressure, temperature, air/fuel ratio, exhaust flow rate and composition sensors may be coupled to various locations in the vehicle system 6. As another example, the actuators may include fuel injectors 66, throttle 62, DPF valves that control filter regeneration (not shown), etc. The control system 14 may include a controller 12. The controller 12 may be configured with computer readable instructions stored on non-transitory memory. The controller 12 receives signals from the various sensors of FIG. 1, processes the signals, and employs the various actuators of FIG. 1 to adjust engine operation based on the received signals and instructions stored on a memory of the controller.

For example, adjusting positions of the first exhaust valve 56 and the second exhaust valve 58 may be in response to one or more temperatures of the TWC and the SRC, as will be described below in FIGS. 2A and 2B.

Thus, the system described above may implement a method comprising flowing lean exhaust gas from a first group of cylinders directly to a three-way catalyst, flowing rich exhaust gas from a second group of cylinders directly to a steam reforming catalyst, and flowing exhaust gas from the steam reforming catalyst to the three-way catalyst. Flowing rich exhaust gas from the second group of cylinders directly to the steam reforming catalyst includes not flowing exhaust gas from the second group of cylinders through a catalyst before flowing exhaust gas from the second group of cylinders to the steam reforming catalyst, and where flowing lean exhaust gas from the first group of cylinders to the three-way catalyst includes not flowing exhaust gas from the first group of cylinders through a catalyst before flowing exhaust gas from the first group of cylinders to the three-way catalyst.

The first group of cylinders are included in a first cylinder bank and the second group of cylinders are included in a second cylinder bank, each of the first group of cylinders and the second group of cylinders comprise at least one cylinder. The first cylinder bank is fluidly coupled to a first exhaust passage and the second cylinder bank is fluidly coupled to a second exhaust passage, and where the first and second exhaust passages merge at a first intersection. The second exhaust passage bifurcates at a location upstream of the first intersection and where an auxiliary passage branches from the second exhaust passage at the bifurcation. The second exhaust passage comprises a first valve for adjusting exhaust gas flow to the first intersection and a second valve for adjusting exhaust gas flow to the auxiliary passage.

Turning now to FIGS. 2A and 2B, they show embodiments 200 and 250 of the engine exhaust 25 operating in a first mode and a second mode, respectively. As such, components previously introduced are similarly numbered in subsequent figures. Embodiments 200 and 250 exclude the turbocharger 90 of FIG. 1. Arrows indicate a direction of exhaust gas flow, wherein differently patterned arrows (e.g., solid line versus dashed lines) may depict exhaust gases having different exhaust gas compositions. Large dash arrows comprise dashes larger than dashes in medium dash arrows, which are larger than small dash arrows.

In one example, the first mode is initiated in response to a TWC temperature being greater than a threshold TWC temperature. The threshold TWC temperature may be based on a light-off temperature of the TWC, which may be substantially equal to 650° C. As such, the first 32 and second 34 cylinder banks may be operated substantially similarly based on driver demand and other engine operating parameters, wherein the cylinders may combust at a stoichiometric air/fuel ratio. Thus, the solid line arrows, in FIG. 2A, represent a substantially stoichiometric exhaust gas flow.

In at least one example, the second mode is initiated when a SRC temperature is less than a threshold SRC temperature. The threshold SRC temperature is based on a light-off temperature of the SRC, which may be substantially equal to 200° C. As such, considering the threshold SRC temperature is less than the threshold TWC temperature, the TWC temperature is also less than the threshold TWC temperature. The first cylinder bank 32 may be operated differently than the second cylinder bank 34. In one example, spark timing, air/fuel ratio, and injection timings may differ between the cylinder banks. Specifically, spark timing in the second cylinder bank may be more delayed, the air/fuel ratio may be less lean (lower ratio of oxygen to fuel), and injection timings may be more delayed compared to the first cylinder bank.

Additionally or alternatively, the second mode is initiated when the TWC temperature is less than the threshold TWC temperature and the SRC temperature is greater than the threshold SRC temperature. The first cylinder bank 32 may be operated differently than the second cylinder bank 34. Specifically, the first cylinder bank 32 may be operated lean (e.g., greater than an air/fuel ratio of 1) and the second cylinder bank 34 may be operated rich (e.g., less than an air/fuel ratio of 1). Thus, large dash arrows of FIG. 2B represent lean exhaust gas flow and medium dash arrows represent rich exhaust gas flow.

Turning now to FIG. 2A, embodiment 200 shows the engine exhaust 25 in the first mode where the first valve 56 is in the open position and the second valve 58 is in the closed position. Exhaust gas from the first cylinder bank 32 flows through the first exhaust passage 50 directly to the TWC 70. As such, there are no other exhaust components or emission control devices located between the first cylinder bank 32 and the TWC 70. Exhaust gas from the second cylinder bank 34 flows through the second exhaust passage 52, through the open first valve 56, and directly to the TWC 70 without flowing through other emission control devices. Thus, during the first mode, exhaust gas from the second cylinder bank 34 does not flow through the auxiliary passage 54 or the SRC 68. As such, exhaust gases from the first cylinder bank 32 and the second cylinder bank 34 mix at a first intersection 202 between the first 50 and second 52 exhaust passages. The first intersection 202 is located downstream of a bifurcation 210 of the second exhaust passage 52 and upstream of the TWC 70. In some examples where a turbocharger is included, the turbine may be arranged at the first intersection 202.

In one example, the first mode is conducted when the TWC 70 is sufficiently hot to oxidize and reduce combustion products. This may occur a threshold time following an engine start (e.g., 30 seconds).

Turning now to FIG. 2B, embodiment 250 shows the engine exhaust 25 in the second mode where the first valve 56 is in the closed position and the second valve 58 is in the open position. Exhaust gas from the first cylinder bank 32 flows through the first exhaust passage 50 directly to the TWC 70. As described above, exhaust gas from the first cylinder bank (represented by large dash arrows) is lean. This means that combustion in the first cylinder bank 32 has more air than stoichiometric or rich combustions. In one example, a UEGO sensor may measure a lambda value of the lean exhaust gas greater than 1.0. Exhaust gas from the second cylinder bank 34 (represented by medium dash arrows) is rich. This means that combustion in the second cylinder bank 34 has more fuel than stoichiometric or lean combustions. In one example, a UEGO sensor may measure a lambda value of rich exhaust gas less than 1.0.

Exhaust gas from the second cylinder bank 34 flows through the open second valve 58 and into the auxiliary passage 54 directly to the SRC 68. As such, there are no other emission control devices located between the second cylinder bank 34 and the SRC 68. The exhaust gas does not flow through the portion of the second exhaust passage 52 downstream of the bifurcation 210. Thus, the exhaust gases from the first 32 and second 34 cylinder banks do not mix in the first intersection 202. After flowing through the SRC 68, the exhaust gas composition is altered as shown medium dash arrows transitioning into small dash arrows. Specifically, exhaust gas upstream of the SRC 68, as shown by medium dash arrows, comprises a greater amount of hydrocarbons and carbon monoxide compared to exhaust gas downstream of the SRC 68, shown by small dash arrows. As illustrated above with respect to equations 1 and 2, the hydrocarbons and carbon monoxide are converted into hydrogen gas and other byproducts.

The hydrogen rich exhaust gas flows into a second intersection 204 located at an inlet of the TWC 70. As shown, the second intersection 204 is downstream of and located closer to the TWC 70 than the first intersection 202. The hydrogen rich exhaust gas mixes with exhaust gas from the first cylinder bank 32 at the second intersection 204 and/or TWC inlet 204. The first cylinder bank 32 produces exhaust gas comprising oxidants (e.g., $O_2$, $NO_x$) while operating lean and the second cylinder bank 34 exhaust gas is modified to comprise reductants (e.g., $H_2$) by oxidizing HCs and CO. As such, the combination of these two exhaust gas flows results in an exothermic redox reaction, thereby promoting a temperature increase of the TWC 70. By merging the exhaust gases at the TWC inlet 204, a greater amount of thermal energy may be transferred to the TWC 70 compared to a more upstream location (e.g., first intersection 202). Said another way, less heat is lost to exhaust system surfaces (e.g., exhaust pipe surfaces, turbine surfaces, etc.) by mixing the exhaust gases adjacent to the TWC 70.

Thus, FIGS. 2A and 2B depict an engine operating method, comprising during a first mode, opening a first valve and closing a second valve to merge exhaust gases from first and second cylinder banks at a first intersection upstream of a three-way catalyst inlet and during a second mode, closing the first valve and opening the second valve to merge exhaust gases from first and second cylinder banks at a second intersection at the three-way catalyst inlet. The first mode further comprises flowing exhaust gases from the first and second cylinder banks directly to a three-way catalyst. The second mode further comprises flowing exhaust gas from the first cylinder bank directly to a three-way catalyst without flowing exhaust through an intervening catalyst and flowing exhaust gas from the second cylinder bank directly to a steam reforming catalyst without flowing exhaust gas through an intervening catalyst. The first cylinder bank is fluidly coupled to a first exhaust passage, and where the second cylinder bank is fluidly coupled to a second exhaust passage, wherein the first valve adjusts exhaust gas flow from the second cylinder bank to the first intersection, and where the second valve adjusts exhaust gas flow from the second cylinder bank to an auxiliary passage. During the first mode, the first and second cylinder banks have equal air/fuel ratios, and where during the second mode, the first cylinder bank exhaust gas flow is lean and the second cylinder bank exhaust gas flow is rich. The first mode is initiated in response to a temperature of a three-way catalyst being greater than a threshold three-way catalyst temperature, the threshold three-way catalyst temperature being based on a light-off temperature of the three-way catalyst, and where the second mode is initiated in response to the temperature of the three-way catalyst being less than the threshold three-way catalyst temperature.

Turning now to FIG. 3, it shows a method 300 for operating the first and second valves (e.g., first valve 56 and second valve 58 of FIGS. 1, 2A, and 2B) based on one or more of a TWC temperature and a SRC temperature. Instructions for carrying out method 300 and the rest of the methods included herein may be executed by a controller (e.g., controller 12) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 may be described with reference to components described above. Specifically, the method 300 may include the engine 10, first exhaust passage 50, the second exhaust passage 52, the first valve 56, the second valve 58, the SRC 68, the TWC 70, the first cylinder bank 32, the second cylinder bank 34, and the auxiliary passage 54 of FIG. 1. With reference to the methods described below, moving the first and/or second valves to from an open to a closed position or vice-versa includes sending a signal from the controller to an actuator of the valve to command the valve to the desired position.

The method 300 may begin at 302 where the method 300 determines, estimates, and/or measures current engine operating parameters. Current engine operating parameters may include one or more of vehicle speed, ambient temperature, ambient humidity, throttle position, accelerator pedal position, exhaust temperature, intake manifold pressure, engine speed, engine temperature, and air/fuel ratio.

At 304, the method 300 includes determining if the TWC temperature is greater than the threshold TWC temperature. As described above, the threshold TWC temperature is based on a light-off temperature of the TWC which is substantially equal to 650° C., in one example. In one example, a temperature sensor is integrated into or located adjacent to the TWC, where feedback from the temperature sensor to a controller corresponds to the TWC temperature. Alternatively, the TWC temperature may be estimated based on an exhaust gas temperature measured upstream of or downstream of the TWC. If the TWC temperature is greater than the threshold TWC temperature, then the method 300 proceeds to 306 to open the first valve and closing the second valve. In this way, the second exhaust passage is fluidly coupled to the first exhaust passage while being hermetically sealed from the auxiliary passage. Thus, exhaust gases from the first and second cylinder banks merge at the first intersection and flow directly to the TWC. This may be substantially similar to the first mode depicted with respect to FIG. 2A.

At 308, the method 300 includes operate both cylinder banks at a stoichiometric air/fuel ratio (e.g., air/fuel ratio substantially equal to 1). Additionally or alternatively, the first and second cylinder banks may be operated based on driver demand or one or more engine operating parameters. In one example, if a particulate filter regeneration is demanded, then one of the first or second cylinder banks may be operated to increase exhaust gas temperature (e.g., delay spark) and the other of the first or second cylinder banks may be operated lean.

At 310, the method 300 includes flowing exhaust gas from the first and second cylinder banks directly to the TWC in the first mode. Exhaust gas from the first and second cylinder banks does not flow to the SRC or to the auxiliary passage. In this way, untreated exhaust gas flows to an activated (lit-off) TWC, where emissions particulates are oxidized and/or reduced. If a turbo is included in the engine, then exhaust gases from the first and second cylinder banks flow to a turbine located at a first intersection prior to flowing to the TWC. As such, exhaust gases flow directly to the turbine in the first mode, in some embodiments.

Returning to 304, if the method 300 determines the TWC temperature is less than the threshold TWC temperature, then the method 300 proceeds to 312. The TWC temperature may be less than the threshold TWC temperature for one or more reasons including but not limited to cold-start and insufficient hot exhaust gas flow. Insufficient hot exhaust gas flow may result from hybrid operation of the vehicle, wherein the vehicle is propelled via an electric motor and the engine is disabled. The engine does not receive one or more of fuel and air when it is disabled. In some examples, air may flow through the cylinders of the engine without injecting fuel. As such, exhaust gas is not produced when the engine is disabled. As such, the TWC temperature and/or SRC temperature may decrease during hybrid vehicle applications.

At 312, the method 300 includes determining if the SRC temperature is greater than the threshold SRC temperature. In one example, the threshold SRC temperature is substantially equal to 200° C. The SRC temperature may be less than the threshold SRC temperature during a cold-start. Additionally, the SRC temperature may fall below the threshold SRC temperature following closure of a second valve, thereby preventing exhaust gas flow to the SRC. As described above, when the SRC is lit-off, the SRC may treat exhaust gas according to equations 1 and 2 described above. If the SRC temperature is greater than the threshold SRC temperature, then the method 300 proceeds to 314.

At 314, the first valve is moved to the closed position and the second valve is moved to the open position. In this way, the second exhaust passage is fluidly coupled to the auxiliary passage while being fluidly sealed from the first exhaust passage. As described above, the SRC is located in the auxiliary passage.

At 316, the method 300 includes operating the first cylinder bank lean and operating the second cylinder bank rich. This may be substantially similar to the second mode described above with respect to FIG. 2B. As such, the first cylinder bank expels substantially oxidative exhaust gas comprising a plurality of $O_2$ and NO into the first exhaust passage. The second cylinder bank expels exhaust gas comprising a plurality of hydrocarbons (HCs) and CO into the second exhaust passage. In one example, cold-start emissions reduction adjustments may be more pronounced in the second cylinder bank than in the first cylinder bank. For example, spark delay in the second cylinder bank may be more delayed than in the first cylinder bank. This may be due to the increased combustion stability of the second cylinder bank operating rich compared to the first cylinder bank operating lean. This may further increase heat provided to the TWC during the second mode.

At 318, the method 300 includes flowing exhaust gas directly from the first cylinder bank to the TWC. At 320, the method 300 includes flowing exhaust gas from the second cylinder bank, through the open second valve, and directly to the SRC. HCs and CO are converted to $H_2$ in the SRC, as described above with respect to equations 1 and 2. As such, $H_2$ rich exhaust gas flows through the auxiliary passage downstream of the SRC.

At 322, the method 300 includes merging exhaust gases from the first exhaust passage and the auxiliary exhaust passage at an inlet of the TWC (e.g., second intersection 204 of FIG. 2B). The $H_2$ rich exhaust gas, which is substantially reductive, reacts with the $O_2$ and NO rich exhaust gas, thereby releasing thermal energy. By doing this, cold start emissions reduction (CSER) adjustments and the re-dox reaction at the TWC inlet may heat the TWC more rapidly than CSER adjustments alone or CSER adjustments in combination with CO and HC rich exhaust gas. In this way, emissions expelled during a cold-start may be significantly reduced.

At 324, the method 300 flows the post-redox reaction exhaust gas mixture through the TWC, where the hot exhaust gas may further heat surfaces of the TWC.

At 326, the method 300 includes determining if the TWC temperature is greater than the threshold TWC temperature. If the TWC temperature is greater than the threshold TWC temperature, then the method 300 proceeds to 306 as described above. In this way, exhaust gas flow to the SRC is terminated in response to the TWC reaching the light-off temperature. This may increase a longevity of the SRC while also increasing fuel economy by no longer operating the second cylinder bank rich. As such, if the TWC temperature exceeds the threshold TWC temperature while flowing exhaust gas to the SRC, the second valve is moved to the closed position and the first valve is moved to the open position.

If the TWC temperature is less than the threshold TWC temperature, then the method 300 proceeds to 328 to maintain current engine operating parameters and continues flowing lean exhaust gas through the first exhaust passage and rich exhaust gas to the auxiliary passage. As such, the oxidative and reductive exhaust gases continue to mix at the TWC inlet and release thermal energy upon combining. The method continues to monitor the TWC temperature.

Returning to 312, if the SRC temperature is not greater than the threshold SRC temperature, then the method 300 proceeds to 330 to close the first valve and open the second valve, thereby fluidly coupling the second exhaust passage to the auxiliary passage while sealing the second passage from the first exhaust passage.

At 332, the method 300 includes operating the first cylinder bank lean, similar to operation of the first cylinder bank at 314 described above.

At 334, the method 300 includes alternating operation of the second cylinder bank between stoichiometric and rich. This differs from operation of the second cylinder bank at 314 in that the second cylinder bank oscillated between rich and stoichiometric. Said another way, operation of the second cylinder bank consumes less fuel when the SRC is less than the threshold SRC temperature compared to when the SRC temperature is greater than the threshold SRC temperature. By oscillating operation of the cylinders of the second bank between rich and stoichiometric, a redox reaction may occur at the SRC. This may increase a rate of heating the SRC such that it reaches the threshold SRC temperature more quickly compared to not oscillating operation of the second cylinder bank (e.g., operating only rich). In some examples, the second cylinder bank may oscillate between rich and lean operation, resulting in a greater flow of oxygen to the SRC compared to oscillation between rich and stoichiometric. Additionally or alternatively, the second cylinder bank may operate rich at 334 and may not oscillate between rich and stoichiometric combustion.

Additionally or alternatively, the second cylinder bank spark delay may be more pronounced at 334 compared to the spark delay at 314. As such, HC emissions and thermal energy released may be greater at 334 than at 314.

At 336, the method 300 includes flowing exhaust gas from the first cylinder bank to the TWC. At 338, the method 300 includes flowing exhaust gas from the second cylinder bank to the SRC. At 340, the method 300 includes merging exhaust gas from the auxiliary passage with exhaust gas from the first cylinder bank at the TWC inlet. The exhaust gas from the SRC may not comprise a sufficient amount of H$_2$ due to the inactivity of the SRC when its temperature is less than the threshold SRC temperature, as such, a redox reaction may not occur at 340.

At 342, the method 300 includes flowing the exhaust gas mixture through the TWC. Following 342, the method 300 proceeds back to 312 to monitor a temperature of the SRC. Once the SRC temperature exceeds the threshold SRC temperature, exhaust gases from the two cylinder banks may initiate the redox reaction at the TWC inlet.

Figure 4:
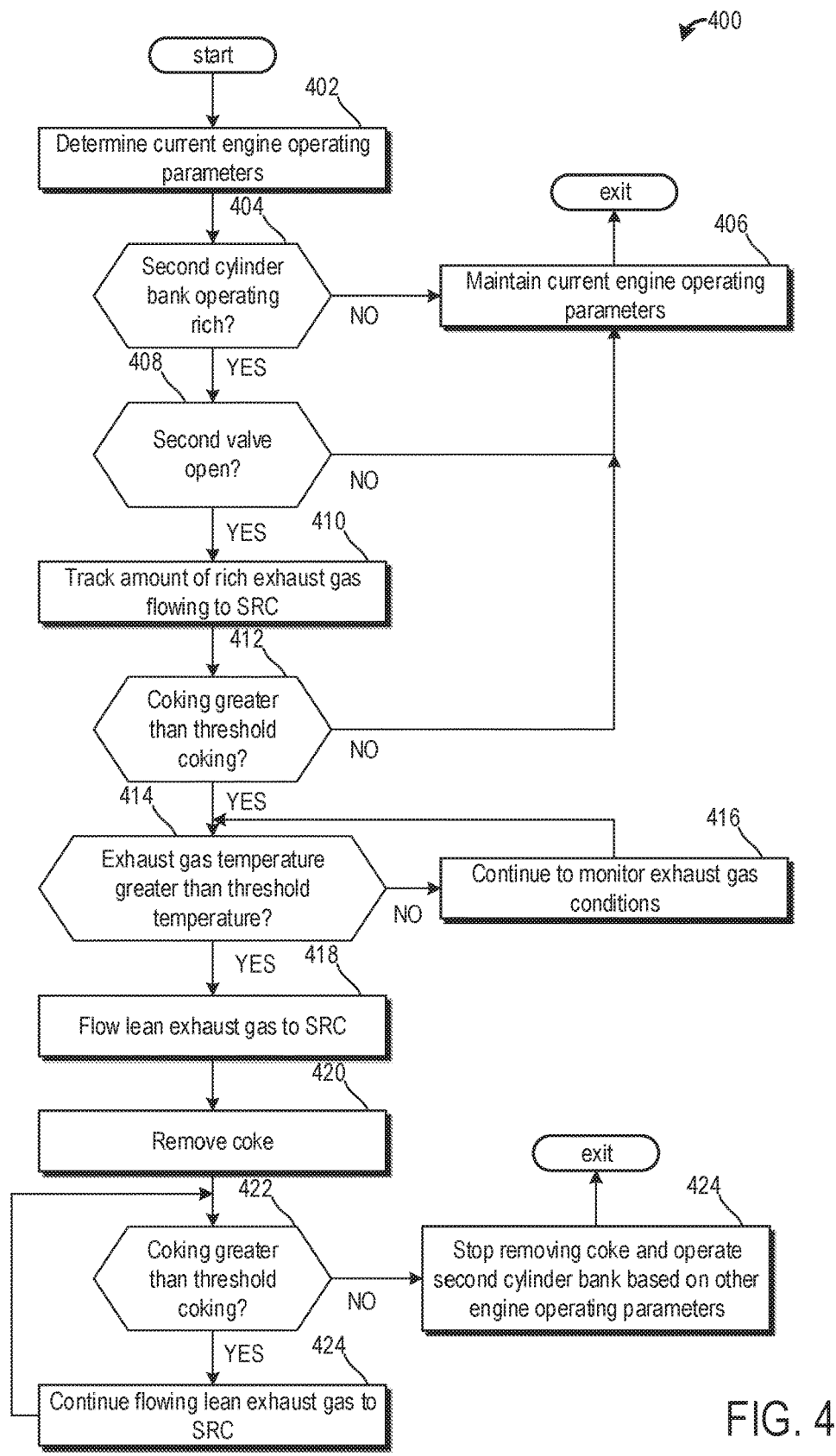
FIG. 4 shows a method for removing particulate matter build-up (e.g., coke) from the SRC and its corresponding exhaust passage.

Turning now to FIG. 4, it shows a method 400 for determining a condition of the SRC. Specifically, the method 400 shows a routine for monitoring an amount of coking on the SRC. As described above, the SRC receives rich combustion gases from the second cylinder bank during some engine operating conditions. Carbon deposits may accumulate during the rich operation, which may coat surfaces of the auxiliary passage and/or SRC. As such, reactivity of the SRC and/or exhaust gas flow rates through the SRC may decrease. The method 400 monitors an amount of coking and provides a routine for decreasing coking when possible.

The method 400 may begin at 402 where the method 400 determines, estimates, and/or measures current engine operating parameters. Current engine operating parameters may include one or more of vehicle speed, ambient temperature, ambient humidity, throttle position, accelerator pedal position, exhaust temperature, intake manifold pressure, engine speed, engine temperature, and air/fuel ratio.

At 404, the method 400 includes determining if the second cylinder bank is operating rich. This may be determined by an exhaust gas sensor located in the second exhaust passage upstream of the bifurcation. The exhaust gas sensor may provide a lambda value corresponding to an air/fuel ratio of the second cylinder bank. If the lambda value is greater than or equal to 1, then the second cylinder bank is not operating rich and the method 400 proceeds to 406 to maintain current engine operating parameters and does not track coking. If the lambda value is less than 1 (e.g., 0.85), then the second cylinder bank is operating rich and the method 400 proceeds to 408 to determine if the second valve is open. It will be appreciated that other parameters may be used to determine if the second cylinder bank is operating rich, for example, it may be determined based on a throttle position and a fueling of the cylinders in the second bank.

At 408, the second valve may be determined open if exhaust gas flow is sensed though the auxiliary passage. If the second valve is closed and exhaust gas is not flowing through the auxiliary passage, then the method 400 proceeds to 406 to maintain current engine operating parameters and does not monitor coking. If the second valve is open and exhaust gas is flowing through the auxiliary passage, then the method 400 proceeds to 410.

At 410, the method 400 includes tracking an amount of exhaust gas flowing to the SRC. First, an amount of air aspirated and/or drawn into the second cylinder bank is calculated based on an engine speed and a volumetric efficiency. Second, fueling of the second cylinder bank is determined along with an exhaust gas temperature of the second cylinder bank exhaust gas. By calculating these variables, an estimation of the exhaust gas flow rate to the SRC may be determined. A controller may track the calculated exhaust gas flow rate for an entire duration that the second cylinder bank operates rich and the second valve stays open. Said another way, once the second valve is moved to a closed position, the tracking is terminated.

At 412, the method 400 includes determining if a coking is greater than a threshold coking. Coking may decrease SRC activity and may restrict a flow-through area of the SRC. The threshold coking may correspond to an amount of coking that decreases activity of the SRC to less than a desired amount of catalytic activity. Additionally, the threshold coking may be based on an exhaust backpressure, wherein the backpressure decreases combustion stability when coking is greater than the threshold coking. If coking is not greater than the threshold coking, then the method proceeds to 406 as described above. If coking is greater than the threshold coking, then the method proceeds to 414.

At 414, the method 400 includes determining if an exhaust gas temperature is greater than a threshold temperature, where the threshold temperature is based on a temperature hot enough to burn coke deposits in the presence of excess oxygen. As such, the removal of coke deposits occurs outside of a condition where the second cylinder bank is operating rich. If the exhaust gas temperature is less than the threshold temperature, then the method proceeds to 416 to continue monitoring the exhaust gas temperature. If the exhaust gas temperature is greater than the threshold temperature, then the method 400 proceeds to 418.

At 418, the method 400 includes flowing lean exhaust gas to the SRC. This may include moving the second valve to an open position if it was previously closed. Additionally, the first valve is moved to the closed position. Thus, this differs from the second mode in that exhaust gas flow to the SRC is lean and not rich. During the coke removal condition where the second cylinder bank is operated lean, the first cylinder bank may be operated at stoichiometric, lean, or rich. As such, the cylinder banks are operated independently.

In one example, the coke removal condition may occur subsequent a pedal tip-in and/or other high load engine operation where exhaust gas temperatures are increased to a temperature greater than the threshold temperature. As such, driver demand may decrease and a majority, if not all, of the driver demand may be met via the first cylinder bank. In this way, the second cylinder bank may be operated lean to flow oxygen rich exhaust gas to the SRC to burn off coke at 420 independently of driver demand.

It will be appreciated that coke removal of the SRC may not be a high priority when the second valve is in a closed position. Backpressure in the auxiliary passage may not encumber engine operation when the second valve is closed. However, once a driver demand decreases and exhaust gas temperatures are sufficiently hot, the first cylinder bank may be operated to meet the driver demand while the second valve is opened and the second cylinder bank is opportunistically operated to remove coke.

At 422, the method 400 determines if the coking is still greater than the threshold coking. If the coking is still greater than the threshold coking, then the method 400 continues to flow lean exhaust gas from the second cylinder bank to the SRC. If the coking is less than the threshold coking, then the method 400 proceeds to 426 to stop removing coke. This may further include closing the second valve, opening the first valve, and adjusting operation of the second cylinder bank to be based on other engine operating parameters (e.g., driver demand). As such, the first and second cylinder bank may share the burden of meeting driver demand.

Turning now to FIG. 5, it shows a method 500 for determining reduction opportunities for the SRC based on a vehicle location and/or operating conditions. In one example, the SRC is opportunistically regenerated by adjusting operation of the second cylinder bank. Additionally or alternatively, the SRC may be regenerated via a reductant injection when conditions for adjusting operation of the second cylinder bank are not present.

The method 500 may begin at 502, where the method 500 determines, estimates, and/or measures current engine operating parameters. Current engine operating parameters may include one or more of vehicle speed, ambient temperature, ambient humidity, throttle position, accelerator pedal position, exhaust temperature, intake manifold pressure, engine speed, engine temperature, and air/fuel ratio.

At 504, the method 500 includes determining a vehicle location. This may be based on feedback from a geolocation device (e.g., navigation system, GPS device, etc.) of the vehicle. This may occur at an engine start and continue during vehicle operation.

At 506, the method 500 includes determining if a final destination is known. The final destination is known if a vehicle operator and/or driver inputs the final destination into a navigation system and/or GPS device. The method 500 proceeds to 508 to estimate a number, duration, and location of possible stop events between the current vehicle location (determined at 504) and the final destination. The GPS device may estimate a number of stop opportunities based on one or more distance, speed limits, known driver behaviors, traffic stops, traffic, estimated travel time, construction, weather, and other on-road conditions.

Returning to 506, if the final destination is not known, then the method 500 proceeds to 510 to predict a number, duration, and location of possible stop events between the current location and a predicted final vehicle destination. In one example, the predicted final destination is based on one or more known locations saved in the navigation system. Additionally or alternatively, the predicted final destination is selected from one or more locations frequently visited by the vehicle operator. This may include a home address, occupational address, school, supermarket, fueling station, retail store, etc. The predicted vehicle final destination may further based on at least a time of day in at least one example. For example, if the driver starts the vehicle at 7:30 a.m. on a Wednesday, then the navigation system may predict a place of occupation (e.g., work) of the driver as the final destination. In one example, the navigation system may provide a prompt for the driver to accept or adjust the predicted final destination. Alternatively, navigation system may adjust the predicted final destination based on a deviation from a known route between the current vehicle location and the predicted final location.

For example, from a home location to a work location, the method may determine a plurality of stop events. The method may filter the stop events based on an estimated duration, wherein stop events with a duration less than a threshold duration (e.g., less than 20 seconds) are no longer considered for implementing reduction of the SRC. Thus, the remaining stop events are tracked and reduction of the SRC may be opportunistically performed. Additionally or alternatively, all of the estimated stop events may be tracked for reducing the SRC, wherein stop events with an estimated duration greater than the threshold duration may include adjusting engine operating parameters of the second cylinder bank to reduce the SRC. Adjusting the engine operating parameters may include operating the second cylinder bank rich, closing the first valve, and opening the second valve. However, during stop events with a duration less than the threshold duration, adjusting the second cylinder bank operating parameters may be undesired due to a tip-in or other driver demand subsequent initiation of the stop. As such, the second cylinder bank operating parameters are not adjusted to reduce the SRC and conditions are maintained to meet an upcoming driver demand and/or engine load. However, the first valve may be closed and the second valve may be opened during the shortened stop, wherein reductant is injected via an injector (e.g., injector 69 of FIG. 1). As such, exhaust gases from the second cylinder bank may heat and mix with the reductant and flow the reductant to the SRC. In one example, the injector injects fuel. In other examples, the injector injects aqueous urea, gaseous ammonia, or some other form of reductant.

It will be appreciated that the SRC may be reduced outside of an engine stop as well. For example, the second cylinder bank may meet a driver demand and/or engine load, the first valve is closed, the second valve is opened, and the reductant injector is activated to inject reductant into the auxiliary passage.

Proceeding to 512, the method 500 includes determining if a stop event is upcoming. A stop event is upcoming if it is within one or more of a threshold distance (e.g., within 0.25 miles) and a threshold time (e.g., within a minute). Additionally or alternatively, the stop event is upcoming if the driver is decelerating and/or braking within the threshold distance to the estimated/predicted location of the stop event. If the stop event is not upcoming, then the method 500 proceeds to 514 to operate cylinders of the first and second banks based on a driver demand and does not flow exhaust gas to the SRC. Thus, the first valve remains open and the second valve remains closed.

Additionally or alternatively, the stop event may be upcoming based on one or more of vehicle speed, brake pedal position, and accelerator pedal position. For example, if the accelerator pedal is in an inclined position (e.g., not depressed), brake pedal is depressed, and vehicle speed is less than a threshold vehicle speed, then an engine stop may be upcoming.

If the stop even is upcoming then the method 500 proceeds to 515 to determine if the SRC temperature is greater than a threshold reduction temperature. In one example, the threshold reduction temperature is greater than an ambient temperature. If the SRC is less than the threshold reduction temperature, then the method 500 proceeds to 514 as described above. However, if the SRC is greater than the threshold reduction temperature, then the method 500 proceeds to close the first valve and open the second valve at 516. In this way, exhaust gas flows to the SRC in the auxiliary passage and does not flow through the second exhaust passage to the first intersection.

At 518, the method 500 includes operating the second cylinder bank rich. As such, the unburned hydrocarbons may reduce surfaces of the SRC. This may allow the SRC to be in a desired oxidation state for a future cold-start. Additionally or alternatively, an injector (e.g., injector 69 of FIG. 1) may be instructed by a controller (e.g., controller 12 of FIG. 1) to inject reductant toward the SRC in response to an engine stop request. Note that the engine stop request may precede stopping engine rotation. In addition to signaling the injector to inject, the first valve is signaled to a closed position and the second valve is moved to an open position, as described above. As such, the second cylinder bank continues to meet a driver demand while exhaust gases from the second cylinder bank are directed to the auxiliary passage. It will be appreciated that the TWC temperature may be greater than the threshold TWC temperature when the SRC is being reduced.

At 520, the method 500 includes flowing exhaust gas directly from the second cylinder bank to the SRC. As such, the SRC is reduced from an electron deficient state to an electron rich state.

At 522, the method 500 includes determining if the stop event is initiated. If the stop event is not initiated, then the method 500 proceeds to 524 to continue flowing exhaust gas to the SRC.

If the stop event is initiated, then cylinders of the first and second cylinder banks are deactivated and the reduction of the SRC is terminated at 526. In one example, the second valve is moved to a closed position and the first valve is moved to an open position. Thus, exhaust gas does not flow to the SRC upon engine restart. In some examples, the stop event may be delayed by firing one or more cylinders to extend a reduction of the SRC. In one example, exactly three more combustions happen upon reception of the engine stop request. Additionally, upon receiving the engine stop request, reductant is injected toward the SRC. In one example, the injector is directed toward an upstream face of the SRC. In this way, combusting three additional times prior to deactivating the engine cylinders, which includes terminating fueling and spark, may increase a likelihood of reductant reaching the SRC. Additionally or alternatively, the reductant injection may continue for a predetermined amount of time during the engine stop. Upon engine restart, exhaust gas from the second cylinder bank and/or group may be directed to the SRC for a threshold amount of time (e.g., five seconds) to distribute reductant to downstream surfaces of the SRC.

Additionally or alternatively, the method 500 may estimate an oxidative state of the SRC based on an amount of reductive exhaust gas flow to the SRC. If the SRC is not reduced to a desired oxidation state, then the method may include maintaining the second valve in an open position and the first valve in the closed position following the stop. Thus, upon engine restart, exhaust gases from the second cylinder bank are directed to the SRC. If engine operating parameters desire the second cylinder bank to operate at stoichiometric, then the injector may be activated to continue reduction of the SRC.

Thus, the figures above describe a system comprising an exhaust system comprising a three-way catalyst and a steam reforming catalyst, an engine comprising a first cylinder group and a second cylinder group, a first exhaust passage fluidly coupled to the first cylinder group and a second exhaust passage fluidly coupled to the second cylinder group, where the first and second exhaust passages intersect upstream of a three-way catalyst inlet at a first intersection, an auxiliary passage branching from the second exhaust passage upstream of the first intersection relative to an exhaust gas flow, where the auxiliary passage merges with the first exhaust passage at the three-way catalyst inlet, a first valve for adjusting exhaust gas flow from the second cylinder group to the first intersection and a second valve for adjusting exhaust gas flow from the second cylinder group to the auxiliary passage, and a controller having computer readable instructions stored on memory that when implemented enable the controller to flow exhaust gas from the second cylinder group directly to the three-way catalyst during a first mode and flow exhaust gas from the second cylinder group directly to the steam reforming catalyst during a second mode.

The first and second valves comprise an open position and a closed position, and where the open position permits exhaust flow and the closed position prevents exhaust flow. The controller further includes instructions for actuating the first valve to an open position and the second valve to a closed position during the first mode, and where the second valve prevents exhaust gas from the second cylinder group to flow to the auxiliary passage. Additionally, the controller further includes instructions for actuating the first valve to a closed position and the second valve to an open position during the second mode, and where the first valve prevents exhaust gas flow from the second cylinder group to the first intersection.

The system further comprises a reductant injector positioned to inject a reductant in the auxiliary passage upstream of the steam reforming catalyst and additional controller instructions to inject the reductant in response to a request to stop combustion in the engine and cease engine rotation. The first and second cylinder groups comprise an equal number of cylinders, and where the reductant is a fuel or $NH_3$.

Turning now to FIG. 6, it shows an operating sequence 600 illustrate example results for an engine (e.g., engine 10 of FIG. 1) operating the method 300 of FIG. 3. Line 602 represents a TWC temperature and line 604 represents a threshold TWC temperature, line 606 represents a SRC temperature, and line 608 represents a threshold SRC temperature, line 610 represents a first valve position, line 612 represents a second valve position, line 614 represents a first cylinder bank air/fuel ratio (AFR), line 616 represents a second cylinder bank AFR, line 618 represents a first bank spark timing and line 620 represents a nominal spark timing, line 622 represents a second cylinder bank spark timing and line 624 represents a nominal spark timing, line 626 represents an activity of the electric motor, and line 628 represents reductant injector activity. As described above, the threshold TWC temperature is based on a light-off temperature of the TWC. The threshold SRC temperature is based on a light-off temperature of the SRC, which is lower than the light-off temperature of the TWC, which is graphically shown in the operating sequence 600. Nominal spark timing, shown by lines 620 and 624, represents a spark timing occurring near the end or at the end of a compression stroke of the engine. Time increases from a left side to a right side of the figure.

At $t_0$, the TWC temperature (line 602) is lower than the threshold TWC temperature (line 604). Similarly, the SRC temperature (line 606) is lower than the threshold SRC temperature (line 608). As such, a cold-start may be occurring. The first valve is moved to a closed position (line 610) and the second valve is moved to an open position (line 612). As such, exhaust gas from the second cylinder bank is directed to the SRC in the auxiliary passage and merges with exhaust gas from the first cylinder bank at an inlet of the TWC. The first cylinder bank AFR (line 614) is lean, as shown by its lambda value being greater than 1.0. The second cylinder bank AFR (line 616) oscillates between rich and stoichiometric, as shown by the undulation of the AFR between lambda values of 1.0 and about 0.8. Spark is delayed in both the first cylinder bank (line 618) and the second cylinder bank (line 622). As shown, the spark delay in the second cylinder bank is greater (e.g., more delayed) than the spark delay in the first cylinder bank. In this way, exhaust gas expelled from the second cylinder bank may be hotter than exhaust gas from the first cylinder bank. The second cylinder bank may achieve higher spark delays compared to the first cylinder bank due to its increased fueling. The electric motor is inactive (e.g., off). The reductant injector is off (line 628). In the example of FIG. 6, the threshold SRC temperature is substantially equal to the threshold reduction temperature described above. However, it will be appreciated that the threshold reduction temperature may be greater than or lower than the threshold SRC temperature without departing from the scope of the present disclosure.

After $t_0$ and prior to $t_1$, the first valve remains closed and the second valve remains open. The TWC temperature and the SRC temperature increase. However, the SRC temperature increases more quickly than the TWC temperature due to exhaust gas from the second cylinder bank being hotter than exhaust gas from the first cylinder bank due to its increased spark delay.

At $t_1$, the TWC temperature continues to increase but remains below the threshold TWC temperature. The SRC temperature is substantially equal to the threshold SRC temperature. As such, the second cylinder bank AFR is operated substantially rich to allow hydrocarbons and carbon monoxides to oxidize in the lit-off SRC. This produces hydrogen gas which may combine with oxidants in the first cylinder bank exhaust gas flow in the inlet of the TWC. To provide even further heating of the TWC, spark timing in the second cylinder bank is further delayed. After $t_1$ and prior to $t_2$, the temperature of the TWC increases more rapidly than the SRC temperature. This is due to the oxidative reaction occurring at the inlet of the TWC between oxygen and nitrogen oxide and hydrogen gas.

At $t_2$, the TWC temperature is substantially equal to the threshold TWC temperature. As such, the second valve is moved to a closed position and the first valve is moved to an open position. Thus, exhaust gas from the second cylinder bank does not flow to the SRC. Additionally, exhaust gases from the first and second cylinder banks merge at a location upstream of the TWC inlet. The first cylinder bank AFR is decreased to a stoichiometric AFR. The second cylinder bank AFR is increased to the stoichiometric AFR. Likewise, spark timing of the first and second cylinder banks are advanced to be substantially equal to nominal spark timings. As such, the first and second cylinder banks are operated substantially similarly following sufficient warm-up of the TWC.

After $t_2$ and prior to $t_3$, the TWC temperature is greater than the threshold TWC temperature. As such, the TWC is sufficiently hot to treat exhaust gas emissions. The SRC temperature continues to decrease since exhaust gas no longer flows to the SRC. The first valve remains open and the second valve remains closed. The first and second bank air/fuel ratios are substantially stoichiometric (e.g., equal to a lambda value of 1.0). The spark timing of the first and second cylinder banks is substantially equal to a nominal spark timing.

In one example, immediately before $t_3$, the accelerator pedal is release, the brake pedal is depressed, and vehicle speed falls below the threshold vehicle speed. This may indicate an engine stop request. At $t_3$, an engine stop request is made and the electric motor is activated to perform a hybrid vehicle application wherein the engine is shut-off. Thus, the electric motor may propel the vehicle in one example. This may be an automatic engine stop. The engine is stopped shortly after t3 via ceasing fuel flow and spark to the engine. The engine is stopped after exhaust gas from a predetermined number of rich combustion events has been directed from the second bank of cylinders to the SRC. As such, the first valve is moved to a closed position and the second valve is moved to an open position. The first bank of cylinders continue to combust stoichiometric or slightly lean air-fuel mixtures while the second group of cylinder continues combusting. Combustion in the first and second groups of cylinders ceases after the predetermined number of combustion events. Thus, shortly after time t3, fuel is no longer delivered to the first cylinder bank, as such, the air/fuel ratio is 2.3 (e.g., substantially only air).

In examples where the exhaust system includes a reductant injector, engine fuel and spark may cease after completing fuel injections that are in progress in response to an engine stop request. Further, reductant may be supplied via the reductant injector in response to the engine stop request. The reductant injector may inject reductant into the auxiliary passage toward the SRC. Additionally or alternatively, the second cylinder bank may continue to combust at a substantially stoichiometric air/fuel ratio for a predetermined number of combustion events after the engine stop request while supplying reductant via the reductant injector. This may assist reductant reaching the SRC. Following the predetermined number of combustion events (e.g., combusting air and fuel via a spark), spark and fuel are terminated and the second cylinder bank is now inactive similar to the first cylinder bank.

Due to the cessation of fueling, exhaust gas is not formed, and temperatures of the TWC and the SRC begin to decrease. After $t_3$ and prior to $t_4$, the temperatures of the TWC and the SRC fall below their respective thresholds due to the absence of hot exhaust gas during the hybrid vehicle application. The reductant injector is deactivated in response to a predetermined amount of reductant being injected or a predetermined amount of reductant injection time elapsing.

In some examples, additionally or alternatively, the second cylinder bank may be reactivated during the hybrid vehicle application to flow exhaust gas to the SRC and the TWC to maintain their temperatures above their respective threshold. As such, power output from the electric motor may decrease proportionally to power output provided from the reactivated second cylinder bank.

In some embodiments, additionally or alternatively, the reductant injector may be active outside of engine stop and hybrid application events. For example, if the SRC temperature is high enough for reduction to occur, then the first valve may be closed and the second valve may be opened despite the TWC temperature being greater than the threshold TWC temperature. As such, reduction may occur during nominal vehicle driving operating parameters.

At $t_4$, the hybrid vehicle application is terminated and the electric motor is deactivated. As such, the cylinders of the first and second cylinder banks are reactivated. Reactivation includes injecting fuel into the cylinders and initiating spark. As shown, the first and second cylinder banks are operated similarly to operation prior to $t_1$. This is due to the temperatures of the TWC and SRC being less than their respective threshold temperatures. Thus, the first cylinder bank is operated lean and has a spark timing which is less delayed than a spark timing in the second cylinder bank, which is operating rich. The first valve is moved to the closed position and the second valve is moved to the open position. After $t_4$ and prior to $t_5$, the second cylinder bank continues to oscillate between rich and stoichiometric operation. The first cylinder bank operates lean. The exhaust gases from the cylinder banks mix at the TWC inlet, however, a redox reaction may not occur due to the SRC not yet being lit-off.

At $t_5$, the SRC is lit-off and the second cylinder bank adjusts to operate rich. The spark delay is increased to provide increased heat energy to the TWC. Lean exhaust gas from the first cylinder bank reacts with exhaust gas treated by the SRC from the second cylinder bank at the TWC inlet, and the reaction releases heat energy to the TWC. As such, the temperature of the TWC increases more rapidly than the SRC temperature due to the reaction. This continues between $t_5$ and $t_6$.

At $t_6$, the TWC is lit-off. As such, the redox reaction is no longer needed to heat the TWC. Thus, the first valve is moved to the open position and the second valve is moved to the closed position. Thus, exhaust gas no longer flows to the SRC. Furthermore, exhaust gas from the second cylinder bank flows directly to the TWC with exhaust gas from the first cylinder bank. Between $t_6$ and $t_7$, the SRC temperature continues to decrease due to the second valve remaining closed, which prevents exhaust flow to the auxiliary passage.

At $t_7$, the TWC temperature remains above the threshold TWC temperature. As such, the first valve remains open and the second valve remains closed. Thus, exhaust gases from the first and second cylinder banks flow directly to the TWC. Operation of the first and second cylinder banks is based on at least driver demand.

In this way, a SRC is used to expedite warm-up of a TWC. Engine cylinders are divided into two groups and/or banks, including a first bank and a second bank. The second bank is configured to flow exhaust gas directly to either the SRC or the TWC based on positions of first and second valves. When the TWC temperature is less than the threshold TWC temperature, the first valve is moved to a closed position and the second valve is moved to an open position. Additionally, the first cylinder bank is operated lean and the second cylinder bank is operated rich. Exhaust gas from the second cylinder bank flowing through the SRC does not mix with exhaust gas from the first cylinder bank until reaching a TWC inlet. The technical effect of maintaining the exhaust gas flows separate is to mitigate heat energy losses through exhaust system surfaces. As such, a redox reaction between oxidants in the lean exhaust gas flow and reductants formed in the rich exhaust gas flow may occur in the TWC inlet. By doing this, the TWC temperature increases more rapidly compared to using only cold-start emissions reduction strategies.

An embodiment for a method comprises flowing lean exhaust gas from a first group of cylinders directly to a three-way catalyst, flowing rich exhaust gas from a second group of cylinders directly to a steam reforming catalyst, and flowing exhaust gas from the steam reforming catalyst to the three-way catalyst. A first example of the method further includes where the steam reforming catalyst comprises Ni impregnated onto a honeycomb-shaped cordierite carrier, where flowing rich exhaust gas from the second group of cylinders directly to the steam reforming catalyst includes not flowing exhaust gas from the second group of cylinders through a catalyst before flowing exhaust gas from the second group of cylinders to the steam reforming catalyst, and where flowing lean exhaust gas from the first group of cylinders to the three-way catalyst includes not flowing exhaust gas from the first group of cylinders through a catalyst before flowing exhaust gas from the first group of cylinders to the three-way catalyst. A second example of the method optionally including the first example further includes where the first group of cylinders are included in a first cylinder bank and the second group of cylinders are included in a second cylinder bank, each of the first group of cylinders and the second group of cylinders comprise at least one cylinder. A third example of the method, optionally including the first and/or second examples, further includes where the first cylinder bank is fluidly coupled to a first exhaust passage and the second cylinder bank is fluidly coupled to a second exhaust passage, and where the first and second exhaust passages merge at a first intersection. A fourth example of the method, optionally including one or more of the first through third examples, further includes where the second exhaust passage bifurcates at a location upstream of the first intersection and where an auxiliary passage branches from the second exhaust passage at the bifurcation. A fifth example of the method, optionally including one or more of the first through fourth examples, further includes where the second exhaust passage comprises a first valve for adjusting exhaust gas flow to the first intersection and a second valve for adjusting exhaust gas flow to the auxiliary passage.

An embodiment of an engine operating method, comprises during a first mode, opening a first valve and closing a second valve to merge exhaust gases from first and second cylinder banks at a first intersection upstream of a three-way catalyst inlet and during a second mode, closing the first valve and opening the second valve to merge exhaust gases from first and second cylinder banks at a second intersection at the three-way catalyst inlet. A first example of the method further includes where the first mode further comprises flowing exhaust gases from the first and second cylinder banks directly to a three-way catalyst. A second example of the method optionally including the first example further includes where the second mode further comprises flowing exhaust gas from the first cylinder bank directly to a three-way catalyst without flowing exhaust through an intervening catalyst and flowing exhaust gas from the second cylinder bank directly to a steam reforming catalyst without flowing exhaust gas through an intervening catalyst. A third example of the method, optionally including the first and/or second examples further includes where the first cylinder bank is fluidly coupled to a first exhaust passage, and where the second cylinder bank is fluidly coupled to a second exhaust passage, wherein the first valve adjusts exhaust gas flow from the second cylinder bank to the first intersection, and where the second valve adjusts exhaust gas flow from the second cylinder bank to an auxiliary passage. A fourth example of the method, optionally including one or more of the first through third examples, further includes where the auxiliary passage houses a steam reforming catalyst. A fifth example of the method, optionally including one or more of the first through fourth examples, further includes where during the first mode, the first and second cylinder banks have equal air/fuel ratios, and where during the second mode, the first cylinder bank exhaust gas flow is lean and the second cylinder bank exhaust gas flow is rich. A fifth example of the method, optionally including one or more of the first through fourth examples, further includes where the first mode is initiated in response to a temperature of a three-way catalyst being greater than a threshold three-way catalyst temperature, the threshold three-way catalyst temperature being based on a light-off temperature of the three-way catalyst, and where the second mode is initiated in response to the temperature of the three-way catalyst being less than the threshold three-way catalyst temperature. A sixth example of the method, optionally including one or more of the first through fifth examples, further includes where a turbine located at the first intersection.

An embodiment of a system comprising an exhaust system comprising a three-way catalyst and a steam reforming catalyst, an engine comprising a first cylinder group and a second cylinder group, a first exhaust passage fluidly coupled to the first cylinder group and a second exhaust passage fluidly coupled to the second cylinder group, where the first and second exhaust passages intersect upstream of a three-way catalyst inlet at a first intersection, an auxiliary passage branching from the second exhaust passage upstream of the first intersection relative to an exhaust gas flow, where the auxiliary passage merges with the first exhaust passage at the three-way catalyst inlet, a first valve for adjusting exhaust gas flow from the second cylinder group to the first intersection and a second valve for adjusting exhaust gas flow from the second cylinder group to the auxiliary passage, a controller having computer readable instructions stored on memory that when implemented enable the controller to flow exhaust gas from the second cylinder group directly to the three-way catalyst during a first mode and flow exhaust gas from the second cylinder group directly to the steam reforming catalyst during a second mode. A first example of the system further includes where the first and second valves comprise an open position and a closed position, and where the open position permits exhaust flow and the closed position prevents exhaust flow. A second example of the system, optionally including the first example, further includes where the controller further includes instructions for actuating the first valve to an open position and the second valve to a closed position during the first mode, and where the second valve prevents exhaust gas from the second cylinder group to flow to the auxiliary passage. A third example of the system, optionally including the first and/or second examples further includes where the controller further includes instructions for actuating the first valve to a closed position and the second valve to an open position during the second mode, and where the first valve prevents exhaust gas flow from the second cylinder group to the first intersection. A fourth example of the system, optionally including one or more of the first through third examples, further includes where a reductant injector positioned to inject a reductant in the auxiliary passage upstream of the steam reforming catalyst and additional controller instructions to inject the reductant in response to a request to stop combustion in the engine and cease engine rotation. A fifth example of the system, optionally including one or more of the first through fourth examples, further includes where first and second cylinder groups comprise an equal number of cylinders, and where the reductant is a fuel or $NH_3$.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   flowing lean exhaust gas from a first group of cylinders directly to a three-way catalyst;
   flowing rich exhaust gas from a second group of cylinders directly to a steam reforming catalyst; and
   flowing exhaust gas from the steam reforming catalyst to the three-way catalyst.

2. The method of claim 1, wherein the steam reforming catalyst comprises Ni impregnated onto a honeycomb-shaped cordierite carrier, where flowing rich exhaust gas from the second group of cylinders directly to the steam reforming catalyst includes not flowing exhaust gas from the second group of cylinders through a catalyst before flowing exhaust gas from the second group of cylinders to the steam reforming catalyst, and where flowing lean exhaust gas from the first group of cylinders to the three-way catalyst includes not flowing exhaust gas from the first group of cylinders through a catalyst before flowing exhaust gas from the first group of cylinders to the three-way catalyst.

3. The method of claim 1, wherein the first group of cylinders are included in a first cylinder bank and the second group of cylinders are included in a second cylinder bank, each of the first group of cylinders and the second group of cylinders comprise at least one cylinder.

4. The method of claim 3, wherein the first cylinder bank is fluidly coupled to a first exhaust passage and the second cylinder bank is fluidly coupled to a second exhaust passage, and where the first and second exhaust passages merge at a first intersection.

5. The method of claim 4, wherein the second exhaust passage bifurcates at a location upstream of the first intersection and where an auxiliary passage branches from the second exhaust passage at the bifurcation.

6. The method of claim 5, wherein the second exhaust passage comprises a first valve for adjusting exhaust gas flow to the first intersection and a second valve for adjusting exhaust gas flow to the auxiliary passage.

7. An engine operating method, comprising:
   during a first mode, opening a first valve and closing a second valve to merge exhaust gases from first and second cylinder banks at a first intersection upstream of a three-way catalyst inlet; and
   during a second mode, closing the first valve and opening the second valve to merge exhaust gases from first and second cylinder banks at a second intersection at the three-way catalyst inlet; and wherein the second mode further comprises flowing exhaust gas from the first cylinder bank directly to a three-way catalyst without flowing exhaust through an intervening catalyst and flowing exhaust gas from the second cylinder bank directly to a steam reforming catalyst without flowing exhaust gas through an intervening catalyst.

8. The method of claim 7, wherein the first mode further comprises flowing exhaust gases from the first and second cylinder banks directly to a three-way catalyst.

9. The method of claim 7, wherein the first cylinder bank is fluidly coupled to a first exhaust passage, and where the second cylinder bank is fluidly coupled to a second exhaust passage, wherein the first valve adjusts exhaust gas flow from the second cylinder bank to the first intersection, and where the second valve adjusts exhaust gas flow from the second cylinder bank to an auxiliary passage.

10. The method of claim 9, wherein the auxiliary passage houses a steam reforming catalyst.

11. The method of claim 7, wherein during the first mode, the first and second cylinder banks have equal air/fuel ratios, and where during the second mode, the first cylinder bank exhaust gas flow is lean and the second cylinder bank exhaust gas flow is rich.

12. The method of claim 7, wherein the first mode is initiated in response to a temperature of a three-way catalyst being greater than a threshold three-way catalyst temperature, the threshold three-way catalyst temperature being based on a light-off temperature of the three-way catalyst, and where the second mode is initiated in response to the temperature of the three-way catalyst being less than the threshold three-way catalyst temperature.

13. The method of claim 7, further comprising a turbine located at the first intersection, and further comprising a controller having computer readable instructions for opening and/or closing the first and/or second valves.

14. A system comprising:
an exhaust system comprising a three-way catalyst and a steam reforming catalyst;
an engine comprising a first cylinder group and a second cylinder group;
a first exhaust passage fluidly coupled to the first cylinder group and a second exhaust passage fluidly coupled to the second cylinder group, where the first and second exhaust passages intersect upstream of a three-way catalyst inlet at a first intersection;
an auxiliary passage branching from the second exhaust passage upstream of the first intersection relative to an exhaust gas flow, where the auxiliary passage merges with the first exhaust passage at the three-way catalyst inlet;
a first valve for adjusting exhaust gas flow from the second cylinder group to the first intersection and a second valve for adjusting exhaust gas flow from the second cylinder group to the auxiliary passage; and
a controller having computer readable instructions stored on memory that when implemented enable the controller to:
flow exhaust gas from the second cylinder group directly to the three-way catalyst during a first mode and flow exhaust gas from the second cylinder group directly to the steam reforming catalyst during a second mode.

15. The system of claim 14, wherein the first and second valves comprise an open position and a closed position, and where the open position permits exhaust flow and the closed position prevents exhaust flow.

16. The system of claim 15, wherein the controller further includes instructions for actuating the first valve to the open position and the second valve to the closed position during the first mode, and where the second valve prevents exhaust gas from the second cylinder group to flow to the auxiliary passage.

17. The system of claim 15, wherein the controller further includes instructions for actuating the first valve to the closed position and the second valve to the open position during the second mode, and where the first valve prevents exhaust gas flow from the second cylinder group to the first intersection.

18. The system of claim 14, further comprising a reductant injector positioned to inject a reductant in the auxiliary passage upstream of the steam reforming catalyst and additional controller instructions to inject the reductant in response to a request to stop combustion in the engine and cease engine rotation.

19. The system of claim 18, wherein the first and second cylinder groups comprise an equal number of cylinders, and where the reductant is a fuel or $NH_3$.

* * * * *